(12) United States Patent
Liu et al.

(10) Patent No.: US 11,940,421 B2
(45) Date of Patent: Mar. 26, 2024

(54) METHOD AND APPARATUS FOR DETECTING BENDING STIFFNESS AND METHOD FOR TESTING DISPLAY PANEL

(71) Applicant: KunShan Go-Visionox Opto-Electronics Co., Ltd, Jiangsu (CN)

(72) Inventors: Yanling Liu, Kunshan (CN); Pengle Dang, Kunshan (CN); Yuliang Li, Kunshan (CN); Yuexing Ma, Kunshan (CN); Xin Tang, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 371 days.

(21) Appl. No.: 17/545,211

(22) Filed: Dec. 8, 2021

(65) Prior Publication Data
US 2022/0099542 A1 Mar. 31, 2022

Related U.S. Application Data

(63) Continuation of application No. PCT/CN2020/111797, filed on Aug. 27, 2020.

(30) Foreign Application Priority Data

Nov. 29, 2019 (CN) .......................... 201911207445.6

(51) Int. Cl.
*G01N 3/20* (2006.01)
*G01M 11/08* (2006.01)

(52) U.S. Cl.
CPC ............... *G01N 3/20* (2013.01); *G01M 11/08* (2013.01); *G01N 2203/0023* (2013.01);
(Continued)

(58) Field of Classification Search
CPC ............ G01N 3/20; G01N 2203/0023; G01N 2203/0282; G01N 2203/0605;
(Continued)

(56) References Cited

U.S. PATENT DOCUMENTS 7,181,979 B1 2/2007 Lin et al.

FOREIGN PATENT DOCUMENTS

CN 103558093 A * 2/2014
CN 103558093 A 2/2014
(Continued)

OTHER PUBLICATIONS

International Search Report (with English Translation) and Written Opinion (with Machine Translation) dated Dec. 1, 2020 in corresponding International Application No. PCT/CN2020/111797; 14 pages.

(Continued)

*Primary Examiner* — Jamel E Williams
(74) *Attorney, Agent, or Firm* — Maier & Maier, PLLC

(57) ABSTRACT

A method and an apparatus for detecting bending stiffness and a method for testing a display panel. The method for detecting bending stiffness includes: arranging an object to be tested on a reference surface to make a stationary portion and a rotating portion of the object to be tested attached to the reference surface, the stationary portion and the rotating portion being connected to each other; driving the rotating portion to bend from the reference surface toward the stationary portion, and acquiring a rotation angle between the rotating portion and the reference surface; acquiring a bending force received by the rotating portion when the rotating portion is bent from the reference surface toward the stationary portion; and determining bending stiffness of the object to be tested on the basis of the bending force and the rotation angle.

20 Claims, 3 Drawing Sheets

(52) U.S. Cl.
CPC ............... *G01N 2203/0282* (2013.01); *G01N 2203/0605* (2013.01); *G01N 2203/0676* (2013.01); *G01N 2203/0682* (2013.01)

(58) Field of Classification Search
CPC .. G01N 2203/0676; G01N 2203/0682; G01M 11/08
See application file for complete search history.

(56) References Cited

FOREIGN PATENT DOCUMENTS

| | | | |
|---|---|---|---|
| CN | 105091833 A | 11/2015 | |
| CN | 105784498 A | 7/2016 | |
| CN | 106501076 A | 3/2017 | |
| CN | 106783660 A | 5/2017 | |
| CN | 107271148 A | 10/2017 | |
| CN | 107631861 A | 1/2018 | |
| CN | 107690564 A | 2/2018 | |
| CN | 108225938 A | 6/2018 | |
| CN | 108447401 A | 8/2018 | |
| CN | 209356328 U | 9/2019 | |
| CN | 110398424 A | 11/2019 | |
| CN | 110836764 A * | 2/2020 | ............ G01M 11/08 |
| CN | 110836764 A | 2/2020 | |
| JP | H1123437 A * | 1/1999 | |
| JP | 201939743 A | 3/2019 | |
| KR | 1020150061956 A | 6/2015 | |
| TW | 200724890 A | 7/2007 | |
| WO | WO-2018086043 A1 * | 5/2018 | ............. G01B 5/213 |

OTHER PUBLICATIONS

Office Action dated Feb. 2, 2021, in connection with corresponding Chinese Application No. 201911207445.6 (33 pp., including machine-generated English translation).

Liu et al., "A Study on Stiffness Measurement Used for Flexible Display Devices", Information Technology and Standardization, No. 12, dated Dec. 31, 2018 (4 pp., including English abstract).

Huang, "Method for Measuring Stiffness of Paper and Paperboard (Taber Stiffness Test)", Packaging Paper Processing and Testing, dated Jan. 31, 2009, (9 pp., including machine-generated English translation).

* cited by examiner

METHOD AND APPARATUS FOR DETECTING BENDING STIFFNESS AND METHOD FOR TESTING DISPLAY PANEL

CROSS-REFERENCE TO RELATED APPLICATIONS

This application is a continuation of International Application No. PCT/CN2020/111797, filed on Aug. 27, 2020, which claims priority to Chinese Patent Application No. 201911207445.6, filed on Nov. 29, 2019, both of which are hereby incorporated by reference in their entireties.

TECHNICAL FIELD

The present application relates to the field of detection technology, and in particular to a method and an apparatus for detecting bending stiffness and a method for testing a display panel.

BACKGROUND

With the continuous development of technology, the requirements for display screens are getting higher and higher. Organic light-emitting diodes (OLEDs) are used for the new generation of displays. Organic thin films are prepared between anode and cathode metals, and an anode and a cathode are energized to make the thin-film devices emit light. OLED displays have advantages of good color contrast, active light emission, wide viewing angle, fast response speed, low energy consumption, thinness, and flexibility.

Currently, OLED displays have a variety of flexible modes including: half-folding, full-folding, curling, twisting, and so on. A series reliability tests for flexibility are required for the devices to meet actual product specifications. However, the detection methods in the prior art cannot meet the requirements for testing flexible display screens.

Therefore, there is an urgent need for a method and an apparatus for detecting bending stiffness and a method for testing a display panel that can meet the test requirements.

SUMMARY

The present application provides a method and an apparatus for detecting bending stiffness and a method for testing a display panel, so that bending stiffness of an object to be tested can be acquired.

An embodiment in a first aspect of the present application provides a method for detecting bending stiffness, including:
  arranging an object to be tested on a reference surface to make a stationary portion and a rotating portion of the object to be tested attached to the reference surface, the stationary portion and the rotating portion being connected to each other;
  driving the rotating portion to bend from the reference surface toward the stationary portion, and acquiring a rotation angle between the rotating portion and the reference surface;
  acquiring a bending force received by the rotating portion when the rotating portion is bent from the reference surface toward the stationary portion with a preset bending length; and
  determining bending stiffness of the object to be tested on the basis of the bending force and the rotation angle.

According to the embodiment in the first aspect of the present application, the acquiring a bending force received by the rotating portion when the rotating portion is bent from the reference surface toward the stationary portion comprises: providing a mechanical sensor between the reference surface and the stationary portion to acquire a first force exerted by the stationary portion to the reference surface, and determining the bending force on the basis of the first force.

Optionally, the acquiring a bending force received by the rotating portion when the rotating portion is bent from the reference surface toward the stationary portion further comprises: disposing the mechanical sensor between the first free end and the reference surface to acquire the first force exerted by the first free end to the reference surface.

Optionally, the acquiring a bending force received by the rotating portion when the rotating portion is bent from the reference surface toward the stationary portion further comprises: disposing the mechanical sensor between the second free end of the rotating portion away from the stationary portion and the first pressing plate to acquire the second force exerted by the second free end to the first pressing plate.

An embodiment in a second aspect of the present application further provides an apparatus for detecting bending stiffness, including: a platform having a reference surface for supporting an object to be tested, the object to be tested including a stationary portion and a rotating portion connected to each other; a driving mechanism configured to drive the rotating portion to bend from the reference surface toward the stationary portion; an angle acquiring module configured to acquire a rotation angle between the rotating portion and the reference surface; a mechanical sensor configured to acquire a bending force received by the rotating portion when the rotating portion is bent from the reference surface toward the stationary portion; a bending stiffness acquiring module connected with the angle acquiring module and the mechanical sensor and configured to determine bending stiffness of the object to be tested on the basis of the rotation angle and the bending force.

The embodiment of the third aspect of the present application also provides a method for testing the display panel, including the method for testing the bending stiffness of the display panel.

In the method for detecting the bending stiffness according to the embodiments of the present application, first, the object to be tested is arranged on the reference surface, and both of the rotating portion and the stationary portion of the object to be tested are arranged against the reference surface. Then the rotating portion is driven to bend from the reference surface toward the stationary portion, where the rotating portion can be bent by 0 degrees to 180 degrees relative to the stationary portion, and the rotation angle between the rotating portion and the reference surface (that is, the bending angle of the object to be tested) is acquired. Then the bending force received by the rotating portion when the rotating portion is bent from the reference surface toward the stationary portion is acquired. Finally, the bending stiffness of the object to be tested can be determined on the basis of the rotation angle and the bending force. In the detection method according to the embodiments of the present application, the steps are easy in implementation, and the bending stiffness of the object to be tested can be accurately measured.

DETAILED DESCRIPTION

Figure 1:
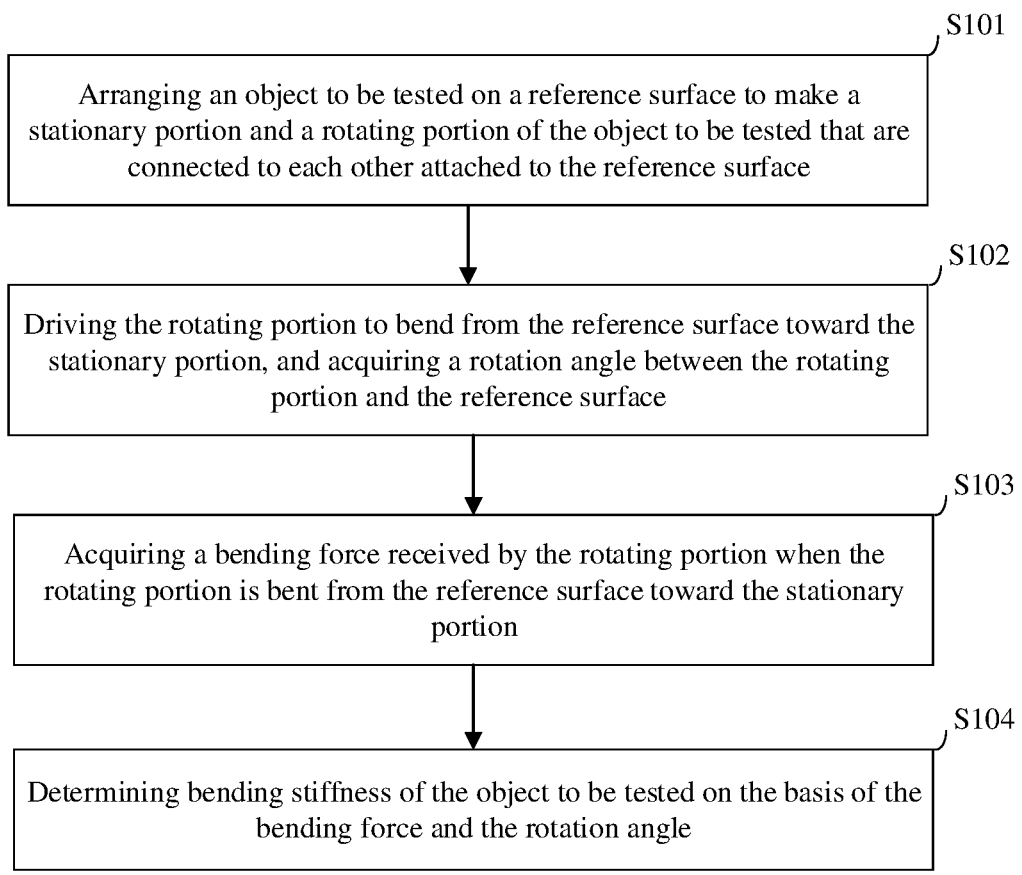
FIG. 1 is a schematic flowchart of a method for detecting bending stiffness according to an embodiment of the present application.

Features and exemplary embodiments in various aspects of the present application will be described in detail below. In the following detailed description, a number of specific details are proposed for a thorough understanding of the present application. However, it is obvious to those skilled in the art that, the present application can be implemented without some of those specific details. The following description of the embodiments is only for the purpose of providing a better understanding of the present application through examples of the present application. In the drawings and the following description, at least some of well-known structures and technologies are not shown in order to avoiding obscuring the present application. For clarity, sizes of some structures may be exaggerated. In addition, features, structures or characteristics described below may be combined in one or more embodiments where appropriate.

For a better understanding of the present application, a method and an apparatus for detecting bending stiffness, and a method for testing a display panel according to the embodiments of the present application will be described in detail below with reference to FIGS. 1 to 4.

Figure 2:
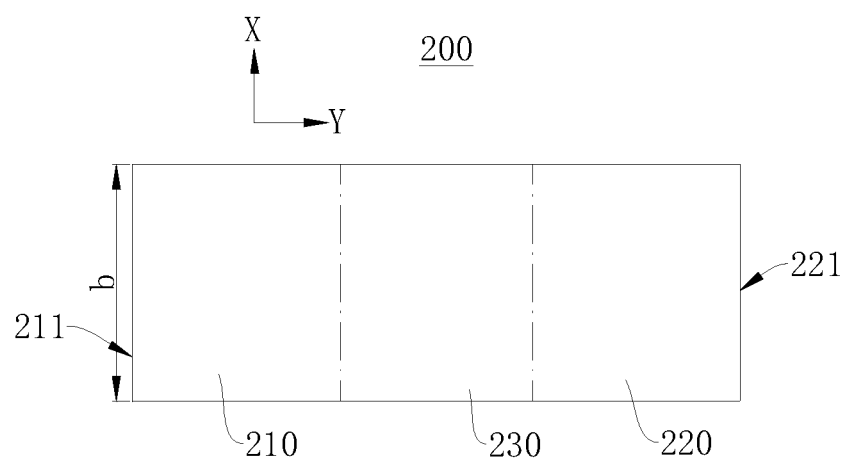
FIG. 2 is a schematic structural diagram of an object to be tested in a method for detecting bending stiffness according to an embodiment of the present application.
Figure 3:
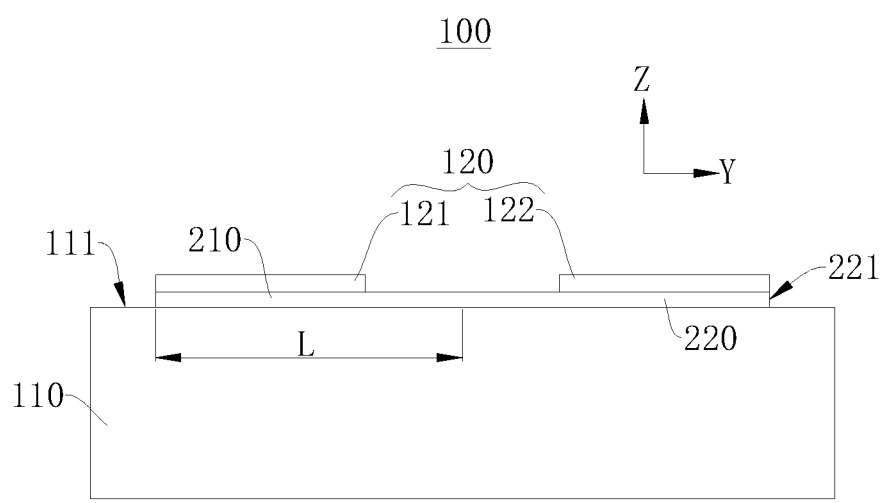
FIG. 3 is a schematic structural diagram of a detecting apparatus according to an embodiment of the present application.
Figure 4:
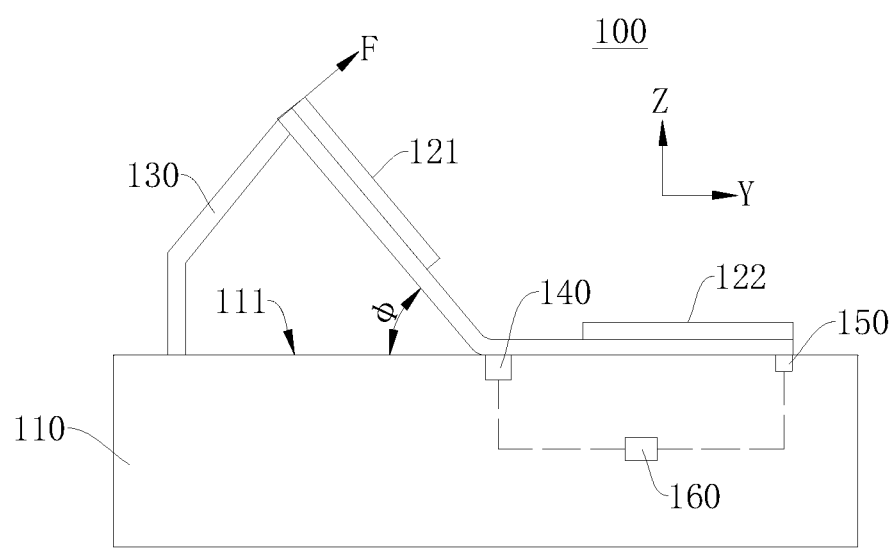
FIG. 4 is a schematic structural diagram of a detecting apparatus when in another state of use according to an embodiment of the present application.

FIG. 1 is a flowchart of a method for detecting bending stiffness according to an embodiment of the present application. FIG. 2 is a schematic structural diagram of an object to be tested. FIG. 3 is a schematic structural diagram of a detecting apparatus according to an embodiment of the present application. FIG. 4 is a schematic structural diagram of a detecting apparatus when in another state of use according to an embodiment of the present application.

As shown in FIG. 1, the method for detecting the bending stiffness includes steps S101-S104.

At step S101, an object to be tested 200 is arranged on a reference surface 111, to make a stationary portion 220 and a rotating portion 210 of the object to be tested 200 being connected to each other attached to the reference surface.

As shown in FIG. 2, the object to be tested 200 may be, for example, a display panel, and further, the object to be tested 200 may be, for example, a flexible display panel.

The object to be tested 200 may be in a number of different shapes, for example, the object to be tested 200 is rectangular.

The rotating portion 210 and the stationary portion 220 may be arranged in a variety of manners. For example, the rotating portion 210 and the stationary portion 220 may be spaced apart along a lengthwise direction of the object to be tested 200 (the Y direction in FIG. 2), and a bending portion 230 may be arranged between the rotating portion 210 and the stationary portion 220. Further, the rotating portion 210 and the stationary portion 220 may be arranged at opposite ends of the object to be tested 200 in the lengthwise direction respectively. Sizes of the rotating portion 210 and the stationary portion 220 may be the same or different. In FIG. 2, a demarcation line between the rotating portion 210 and the bending part 230 and a demarcation line between the bending part 230 and the stationary portion 220 are illustrated as dashed lines, but the structure of the object to be tested 200 is not limited thereto.

The stationary portion 220 and the rotating portion 210 being arranged against the reference surface does not mean that the stationary portion 220 and the rotating portion 210 are strictly and fully attached to the reference surface 111. Instead, it means that the stationary portion 220 and the rotating portion 210 are supported by the reference surface 111 and the stationary portion 220 and the rotating portion 210 are substantially attached to the reference surface 111.

According to some optional embodiments, the stationary portion 220 may be fixed to the reference surface 111 to prevent the stationary portion 220 from moving during the bending process of the object to be tested 200 and affecting the accuracy of the detection result.

The stationary portion 220 may be fixed to the reference surface 111 through a variety of manners. For example, the stationary portion 220 may be fixed to the reference surface 111 using a connecting member 120. The connecting member 120 may be arranged in a variety of manners. As an optional embodiment, the connecting member 120 may include a second pressing plate 122 being arranged on the stationary portion 220. The stationary portion 220 may be fixed to the reference surface 111 by the second pressing plate 122.

At step S102, the rotating portion 210 is driven to bend from the reference surface 111 toward the stationary portion 220, and a rotation angle between the rotating portion 210 and the reference surface 111 is acquired.

The rotating portion 210 may be driven to bend from the reference surface 111 toward the stationary portion 220 through a variety of manners. For example, the apparatus 100 for detecting the bending stiffness may include a driving mechanism 130 connected to the rotating portion 210. the rotating portion 210 is driven by the driving mechanism 130 to bend from the reference surface 111 toward the stationary portion 220.

The rotation angle $\varphi$ between the rotating portion 210 and the reference surface 111 may be acquired through a variety of manners. For example, an angle acquiring module 140 may be arranged on the rotating portion 210 or the reference surface 111, and the rotation angle $\varphi$ may be acquired by the angle acquiring module 140. Alternatively, the driving mechanism 130 may be controlled by a controller to drive the rotating portion 210 to bend to a preset angle, where the preset angle may be taken as the rotation angle $\varphi$.

As shown in FIG. 3, in order to improve the accuracy of the detection result, in some optional embodiments, before step S102, the method may further include: arranging a first pressing plate 121 on the rotating portion 210 to keep the rotating portion 210 flat during the bending process. In this embodiment, since the first pressing plate 121 is arranged on the rotating portion 210, the rotating portion 210 and the first pressing plate 121 are arranged against each other. As shown in FIG. 4, when the rotating portion 210 is bent from the reference surface 111 toward the stationary portion 220, the rotating portion 210 will be flat due to the restriction by the first pressing plate 121, so that the rotation angle can be accurately acquired.

According to an optional embodiment, before step S102, the method may further include: arranging a second pressing plate 122 on the stationary portion 220, fixing the stationary portion 220 to the reference surface 111 by the second pressing plate 122, where a gap exists between the second pressing plate 122 and the first pressing plate 121. The size of the second pressing plate 122 may be the same as that of the stationary portion 220, and the second pressing plate 122 completely covers the stationary portion 220. Alternatively, the size of the second pressing plate 122 may be smaller than the size of the stationary portion 220, and the second pressing plate 122 covers the side of the stationary portion 220 that is away from the rotating portion 210.

According to these embodiments, a second pressing plate 122 is arranged on the stationary portion 220, and the second pressing plate 122 can fix the stationary portion 220 to the reference surface 111. The gap exists between the second pressure plate 122 and the first pressure plate 121, and a bending radius can be controlled by controlling the dimension of the gap, that is, the bending radius can be determined from the gap between the second pressure plate 122 and the first pressure plate 121. The bending radius is the radius of the bending portion of the object to be tested 200. As shown in FIG. 4, when the rotating portion 210 is rotated from the reference surface 111 toward the stationary portion 210 so that the object to be tested 200 is bent, the object to be tested 200 can be bent by its portion corresponding to the gap, that is, the object to be tested 200 can be bent by the bending portion 230. The size of the bending portion 230 can be adjusted by adjusting the gap between the first pressing plate 121 and the second pressing plate 122, and thus the bending radius of the object to be tested 200 can be adjusted.

At step S103, a bending force received by the rotating portion when the rotating portion is bent from the reference surface toward the stationary portion with a preset bending length is acquired.

The bending force may be acquired through a variety of manners. In some optional embodiments, a mechanical sensor 150 may be provided between the reference surface 111 and the stationary portion 220. A first force exerted by the stationary portion 220 to the reference surface 111 may be acquired through the mechanical sensor 150, and the bending force may be determined from the first force.

According to those embodiments, during the bending process of the object to be tested 200, when the bending force is exerted to the rotating portion 210 so that the rotating portion 210 is bent from the reference surface toward the stationary portion 220, the stationary portion 220 exerts a reactive force to the reference surface 111. The mechanical sensor 150 may acquire the first force exerted by the stationary portion 220 to the reference surface 111, that is, the reactive force, and the bending force may be determined from the reactive force. In general, within the error allowed, the first force and the bending force have the same magnitude but are along opposite directions.

According to some optional embodiments, the stationary portion 220 may have a first free end 221 away from the rotating portion 210. The mechanical sensor 150 may be disposed between the first end and the reference surface 111 to acquire the force exerted by the first free end 221 to the reference surface 111 and take the force exerted by the first free end 221 to the reference surface 111 as the first force.

The bending force generally refers to the force exerted to an outer edge of the rotating portion 210 away from the bending center, so the reactive force exerted by the first free end 221 can more accurately reflect the bending force. According to those embodiments, the mechanical sensor 150 is disposed corresponding to the first free end 221, and the force exerted by the first free end 221 to the reference surface 111 is taken as the first force. From the first force, the bending force can be determined more accurately, which improves the accuracy of the detection result.

The bending force may also be acquired through other manners. According to some other optional embodiments, the mechanical sensor 150 may be disposed between the first pressing plate 121 and the rotating portion 210 for acquiring a second force exerted by the rotating portion 210 to the first pressing plate 121, and the bending force may be determined from the second force.

According to those embodiments, when the rotating portion 210 receives the bending force, the rotating portion 210 applies a driving force to the first pressing plate 121 located thereon. The mechanical sensor 150 may be disposed between the first pressing plate 121 and the rotating portion 210 for acquiring the driving force (that is, the second force), and the bending force may be determined from the second force. In general, within the error allowed, the second force and the bending force have the same magnitude and are along the same direction.

The mechanical sensor 150 may be disposed at various positions between the first pressing plate 121 and the rotating portion 210. According to some optional embodiments, the rotating portion 210 may have a second free end 211 away from the stationary portion 220, and the mechanical sensor 150 may be provided between the second free end 211 and the first pressure plate 121 to acquire the force exerted by the second free end 211 to the first pressure plate 121 and take the force exerted by the second free end 211 to the first pressure plate 121 as the second force.

According to these embodiments, the mechanical sensor 150 may be disposed between the second free end 211 and the first pressure plate 121, so that the mechanical sensor 150 may acquire the force exerted by the second free end 211 to the first pressure plate 121, which is more approximate to the bending force. By determining the bending force from the force, the accuracy of the detection result can be improved.

According to other optional embodiments, in order to further improve the accuracy of the detection result, at step S102, the rotating portion 210 is driven to be bent uniformly at a predetermined angular velocity. As a result, the bending force received by the rotating portion 210 during the bending process is more stable, and the acquired bending force is more accurate, so that the accuracy of the detection result can be improved. According to those embodiments, a rotation angle may be determined from a rotation time and the preset angular velocity.

The bending force is a force received by the rotating portion 120 at a moment when the rotating portion 120 is bent uniformly at a predetermined angular velocity to the rotation angle. The force acquired by the mechanical sensor 150 when the rotating portion 120 is bent uniformly at a predetermined angular velocity to the rotation angle may be taken as the bending force.

At step S104, the bending stiffness of the object to be tested is determined on the basis of the bending force and the rotation angle.

There are a variety of manners for determining the bending stiffness on the basis of the bending force and the rotation angle. According to some optional embodiments, the bending stiffness may be acquired according to the following equation:

$$S_b = \frac{19.1 F L^2}{\varphi b}. \tag{1}$$

$S_b$ is the bending stiffness of the object to be tested 200, in millinewton meters (mN·m). F is the bending force, in Newtons (N). L is the bending length, in millimeters (mm). $\varphi$ is the bending angle, that is, the rotation angle. b is a width of the object to be tested 200, in millimeters (mm), that is, b is an extension distance of the object to be tested 200 in the width direction (the X direction shown in FIG. 2).

The bending length L may be the distance from the position on the object 200 to be tested to which the bending force F is exerted to the position by which the object 200 to be tested is bent. The bending length L may be a constant determined by the user according to the specific experimental conditions of the object 200 to be tested. For example, when the rotating portion 210 is bent from the reference surface 111 toward the stationary portion 220, and the object to be tested 200 is bent at its middle position in the longitudinal direction, the bending length L is half of the length of the object to be tested 200. The bending length L is the length of the portion of the object to be tested 200 departing from the reference surface 111 during the bending process.

In the method for detecting the bending stiffness according to the embodiments of the present application, first, the object to be tested 200 is arranged on the reference surface 111, and the rotating portion 210 and the stationary portion 220 of the object to be tested 200 are arranged against the reference surface 111. Then the rotating portion 210 is driven to be bent from the reference surface 111 toward the stationary portion 220, and the rotating portion 210 can be rotated by 0° to 180° relative to the stationary portion 220. The rotation angle between the rotating portion 210 and the reference surface 111 (that is the bending angle of the object to be tested 200) is acquired. The bending force when the rotating portion 210 is bent from the reference surface 111 toward the stationary portion 210 is acquired. Finally, the bending stiffness of the object to be tested 200 can be determined on the basis of the rotation angle and the bending force. In the detection method according to the embodiments of the present application, the steps are easy to implement, the test can be performed by a wide range of 0° to 180°, and the bending stiffness of the object 200 to be tested can be accurately measured.

According to other optional embodiments, multiple bending forces F of the object to be tested 200 may be acquired by changing the preset angular velocity V, the bending radius R, the bending length L, and the rotation angle φ. Multiple values of the bending stiffness of the object to be tested 200 may be calculated, and the final bending stiffness of the object to be tested 200 may be determined on the basis of the multiple values of the bending stiffness.

As shown in the following table, the multiple values of the bending stiffness of the object 200 to be tested are acquired by changing the preset angular velocity V, the bending radius R, the bending length L, and the rotation angle φ.

|   | V(°/S) | R(mm) | L(mm) | F/mN(30°) | F/mN(60°) | F/mN(120°) |
|---|---|---|---|---|---|---|
| 1 | 2 | 3 | 37.5 | 458.64 | 1450.4 | 4349.24 |
| 2 | 2 | 4 | 75 | 253.82 | 997.64 | 3369.24 |
| 3 | 2 | 5 | 110 | 135.24 | 693.84 | 2577.4 |
| 4 | 5 | 3 | 110 | 292.04 | 1058.4 | 3998.4 |
| 5 | 5 | 4 | 37.5 | 372.4 | 1264.2 | 3606.4 |
| 6 | 5 | 5 | 75 | 282.24 | 889.84 | 3998.4 |
| 7 | 10 | 3 | 75 | 180.32 | 1262.24 | 4255.16 |
| 8 | 10 | 4 | 110 | 184.24 | 772.24 | 3116.4 |
| 9 | 10 | 5 | 37.5 | 283.22 | 1068.2 | 3018.4 |

In the table, F/mN (30°) represents a bending force acquired when the bending angle φ is 30°. For example, Row 1 in the table indicates that when the preset angular velocity V is 2°/S, the bending radius R is 3 mm, and the bending length L is 37.5 mm, the bending force F measured when the rotating portion 210 is bent to 30° is 458.64 mN, the bending force F measured when the rotating portion 210 is bent to 60° is 1450.4 mN, and the bending force F measured when the rotating portion 210 is bent to 120° is 4349.24 mN.

There are multiple manners for acquiring the above set of experimental data. According to some embodiments, the rotating portion 220 may be rotated to an experimental angle greater than a preset angle. For example, the experimental angle may be 130° or greater, so that the bending force received by the rotating portion 220 when it is rotated to different angles, such as 30°, 60°, and 120°, may be measured during the rotating process to 130°.

According to an embodiment of the present application, there is further provided a method for testing a display panel, using the method for detecting the bending stiffness described in any of the above embodiments to detect the bending stiffness of the display panel.

In another aspect, a detecting apparatus 100 is further provided according to an embodiment of the present application, which includes: a platform 110 having a reference surface 111 for an object to be tested 200, the object to be tested 200 including a stationary portion 220 and a rotating portion 210 connected to each other; a driving mechanism 130 configured to drive the rotating portion 210 to rotate from the reference surface 111 toward the stationary portion 220; an angle acquiring module 140 configured to acquire a rotation angle between the rotating portion 210 and the reference surface 111; a mechanical sensor 150 configured to acquire a bending force received by the rotating portion 210 when the rotating portion 210 is rotated from the reference surface 111 toward the stationary portion 220; a bending stiffness acquiring module 160 connected with the angle acquiring module 140 and the mechanical sensor 150 and configured to determine bending stiffness of the object to be tested 200 on the basis of the rotation angle and the bending force.

FIG. 3 and FIG. 4 illustrate connection relationships between the bending stiffness acquiring module 160, the angle acquiring module 140, and the mechanical sensor 150 in dotted lines. The dotted lines are illustrated only for indicating that the bending stiffness acquiring module 160 are connected with both the acquiring module 140 and the mechanical sensor 150, instead of limiting the structure of the detecting apparatus. The bending stiffness acquiring module 160, the angle acquiring module 140, and the mechanical sensor 150 may be electrically connected via a communication cable, or the bending stiffness acquiring module 160, the angle acquiring module 140, and the mechanical sensor 150 may be connected through a wireless network or a local area network.

The bending stiffness acquiring module 160 may be set in other positions than the carrying platform 110. The bending stiffness acquiring module 160 may be set at any other suitable position, as long as the bending stiffness acquiring module 160 is connected with the angle acquiring module 140 and the mechanical sensor 150, and the bending stiffness acquiring module 160 can determine the bending stiffness of the object to be tested 200 on the basis of the rotation angle and the bending force.

There may be a variety of setting positions for the angle acquiring module 140. As shown in FIG. 3 and FIG. 4, the angle acquiring module 140 may be set corresponding to the bending portion of the object to be tested 200 for acquiring the rotation angle. Alternatively, the angle acquiring module 140 may be arranged in other positions, as long as the angle obtaining module 140 can acquire the rotation angle.

In the detecting apparatus 100 of the present application, the object to be tested 200 may be arranged on the reference surface 111. The driving mechanism 130 may drive the rotating portion 210 to bend by an angle ranging from 0° to 180° relative to the stationary portion 220. The angle acquiring module 140 and the mechanical sensor 150 may acquire the rotation angle and the bending force, respectively. Finally, the bending stiffness acquiring module 160 may determine the bending stiffness of the object to be tested 200. The detecting apparatus 100 of the present application has a simple structure and can accurately measure the bending stiffness of the object to be tested 200.

According to some optional embodiments, the detecting apparatus 100 may further include a connecting member 120 configured to fix the stationary portion 220 on the reference surface 111 to prevent the stationary portion 220 from moving during the bending process of the object 200 to be tested and affecting the accuracy of the detection result.

The connecting member 120 may be arranged in a variety of manners. According to some optional embodiments, the connecting member 120 may include a first pressing plate 121 and a second pressing plate 122. The first pressing plate 121 may cover the rotating portion 210 to keep the rotating portion 210 flat during the bending process. The second pressing plate 122 may cover the stationary portion 220 to fix the stationary portion 220 on the reference surface 111.

The mechanical sensor 150 may be arranged in a variety of positions. According to some optional embodiments, as shown in FIG. 3 and FIG. 4, the mechanical sensor 150 may be disposed on the platform 110 and correspond to the stationary portion 220 for acquiring a first force exerted by the stationary portion 220 to the reference surface 111. Further, the mechanical sensor 150 may be disposed corresponding to the first free end 221 of the stationary portion 220 to acquire the force exerted by the first free end 221 to the reference surface 111 and take the force exerted by the first free end 221 to the reference surface 111 as the first force.

According to other optional embodiments, the mechanical sensor 150 may be disposed on the side of the first pressing plate 121 facing the rotating portion 210 to acquire a second force exerted by the rotating portion 210 to the first pressing plate 121. Further, the mechanical sensor 150 may be disposed corresponding to the second free end 211 of the rotating portion 210 to acquire the force exerted by the second free end 211 to the first pressure plate 121 and take the force exerted by the second free end 211 to the first pressure plate 121 as the second force.

Those skilled in the art should understand that the above embodiments are for illustration instead of limitation. Different technical features appearing in different embodiments can be combined to achieve beneficial effects. Those skilled in the art will understand and implement other embodiments modified from the disclosed embodiments after studying the drawings, description, and claims. In the claims, the term "comprising" does not exclude other means or steps. When an article is not preceded by a quantitative word, it is intended to include one or multiple articles, and can be construed interchangeably with "one or multiple articles". The terms "first" and "second" are used for distinguishing between elements and not necessarily for describing a particular sequential order. No reference signs in the claims should be construed as limiting the protection scope. The functions of multiple portions in the claims can be implemented by a single hardware or software module. The appearance of certain technical features in different dependent claims does not mean that those technical features cannot be combined to achieve beneficial effects.

What is claimed is:

1. A method for detecting bending stiffness, comprising:
    arranging an object to be tested on a reference surface to make a stationary portion and a rotating portion of the object to be tested attached to the reference surface, the stationary portion and the rotating portion being connected with each other;
    driving the rotating portion to bend from the reference surface toward the stationary portion and acquiring a rotation angle between the rotating portion and the reference surface;
    acquiring a bending force received by the rotating portion when the rotating portion is bent from the reference surface toward the stationary portion; and
    determining bending stiffness of the object to be tested according to the bending force and the rotation angle.

2. The method according to claim 1, wherein the acquiring a bending force received by the rotating portion when the rotating portion is bent from the reference surface toward the stationary portion comprises: providing a mechanical sensor between the reference surface and the stationary portion to acquire a first force exerted by the stationary portion to the reference surface, and determining the bending force on the basis of the first force.

3. The method according to claim 2, wherein the acquiring a bending force received by the rotating portion when the rotating portion is bent from the reference surface toward the stationary portion further comprises: disposing the mechanical sensor between a first free end of the stationary portion away from the rotating portion and the reference surface to acquire the first force exerted by the first free end to the reference surface.

4. The method according to claim 1, wherein before the driving the rotating portion to bend the rotating portion from the reference surface toward the stationary portion, and acquiring a rotation angle between the rotating portion and the reference surface, the method further comprises:
    arranging a first pressing plate on the rotating portion to keep the rotating portion flat during a bending process.

5. The method according to claim 4, wherein the acquiring a bending force received by the rotating portion when the rotating portion is bent from the reference surface toward the stationary portion further comprises: providing a mechanical sensor between the first pressing plate and the rotating portion to acquire a second force exerted by the rotating portion to the first pressing plate, and determining the bending force on the basis of the second force.

6. The method according to claim 5, wherein the acquiring a bending force received by the rotating portion when the rotating portion is bent from the reference surface toward the stationary portion further comprises: disposing the mechanical sensor between a second free end of the rotating portion away from the stationary portion and the first pressing plate to acquire the second force exerted by the second free end to the first pressing plate.

7. The method according to claim 4, wherein before the driving the rotating portion to bend the rotating portion from the reference surface toward the stationary portion, and acquiring a rotation angle between the rotating portion and the reference surface, the method further comprises:
    arranging a second pressing plate on the stationary portion to fix the stationary portion on the reference surface, wherein the second pressing plate and the first pressing plate having a gap provided therebetween.

8. The method according to claim 1, wherein the driving the rotating portion to bend from the reference surface toward the stationary portion, and acquiring a rotation angle between the rotating portion and the reference surface further comprises: driving the rotating portion to bend uniformly at a predetermined angular velocity.

9. The method according to claim 8, wherein the acquiring a bending force received by the rotating portion when the rotating portion is bent from the reference surface toward the stationary portion comprises: acquiring a bending force when the rotating portion is bent uniformly at the predetermined angular velocity to the rotation angle as the bending force.

10. The method according to claim 7, further comprising: adjusting the gap between the second pressing plate and the first pressing plate to adjust a bending radius of the object to be tested.

11. An apparatus for detecting bending stiffness, wherein the apparatus is configured to implement the method according to claim 1 and the apparatus comprises:
   a platform having a reference surface for supporting an object to be tested, the object to be tested comprising a stationary portion and a rotating portion connected to each other;
   a driving mechanism configured to drive the rotating portion to bend from the reference surface toward the stationary portion;
   an angle acquiring module configured to acquire a rotation angle between the rotating portion and the reference surface;
   a mechanical sensor configured to acquire a bending force received by the rotating portion when the rotating portion is bent from the reference surface toward the stationary portion;
   a bending stiffness acquiring module connected with the angle acquiring module and the mechanical sensor and configured to determine bending stiffness of the object to be tested on the basis of the rotation angle and the bending force.

12. The apparatus according to claim 11, wherein the mechanical sensor is disposed on the platform and corresponds to the stationary portion, and the mechanical sensor is configured to acquire a first force exerted by the stationary portion to the reference surface and determine the bending force on the basis of the first force.

13. The apparatus according to claim 12, wherein the stationary portion has a first free end away from the rotating portion, the mechanical sensor is disposed between the first free end and the reference surface, and the mechanical sensor is configured to acquire the first force exerted by the first free end to the reference surface.

14. The apparatus according to claim 11, further comprising a connecting member configured to fix the stationary portion on the reference surface to prevent the stationary portion of the object to be tested from moving during a bending process.

15. The apparatus according to claim 14, wherein the connecting member comprises a first pressing plate and a second pressing plate, the first pressing plate covers the rotating portion to keep the rotating portion flat during the bending process, and the second pressing plate covers the stationary portion to fix the stationary portion on the reference surface.

16. The apparatus according to claim 15, wherein the mechanical sensor is disposed on a side of the first pressing plate facing the rotating portion, and the mechanical sensor is configured to acquire a second force exerted by the rotating portion to the first pressing plate, and determine the bending force on the basis of the second force.

17. The apparatus according to claim 16, wherein the rotating portion has a second free end away from the stationary portion, the mechanical sensor is disposed in correspondence to the second free end of the rotating portion, and the mechanical sensor is configured to acquire the second force exerted by the second free end to the first pressing plate.

18. The apparatus according to claim 11, wherein the driving mechanism is configured to drive the rotating portion to bend uniformly at a predetermined angular velocity.

19. The apparatus according to claim 18, wherein the mechanical sensor is configured to acquire a bending force when the rotating portion is bent uniformly at the predetermined angular velocity to the rotation angle as the bending force.

20. The apparatus according to claim 15, wherein a gap exists between the second pressing plate and the first pressing plate, and a size of the gap is adjustable.

* * * * *